United States Patent [19]
Elsner

[11] Patent Number: 5,201,842
[45] Date of Patent: Apr. 13, 1993

[54] COUPLING WITH A HYDRAULICALLY PRESSURIZED HUB

[75] Inventor: Ernst Elsner, Herbrechtingen, Fed. Rep. of Germany

[73] Assignee: J.M. Voith GmbH, Heidenheim, Fed. Rep. of Germany

[21] Appl. No.: 827,407

[22] Filed: Jan. 29, 1992

[30] Foreign Application Priority Data

Jan. 31, 1991 [DE] Fed. Rep. of Germany ....... 4102847

[51] Int. Cl.⁵ .............................................. F16B 2/04
[52] U.S. Cl. ......................................... 403/5; 403/15; 403/31
[58] Field of Search ................................ 403/5, 31, 15

[56] References Cited

U.S. PATENT DOCUMENTS 3,917,422 11/1975 Betzler ................................... 403/15
4,264,229 4/1981 Falk et al. ............................... 403/5
4,752,275 6/1988 Lindenthal ........................... 403/5 X Primary Examiner—Andrew V. Kundrat
Attorney, Agent, or Firm—Baker & Daniels

[57] ABSTRACT

The invention concerns a coupling with a hub, for transmitting a torque to a shaft, with a cylindrical annular chamber arranged in the hub at a slight spacing from the shaft. The annular chamber can be pressurized with an hydraulically actuated servo valve arranged in the hydraulic fluid channel connecting to said annular chamber. A separate hydraulic fluid channel serves to actuate the servo valve. As control pressure is admitted to this second hydraulic fluid channel, the servo valve opens and establishes the connection between the first hydraulic fluid channel and the annular chamber for admission of a high-pressure medium. The advance of the connecting nipples onto the hub may be effected by remote actuation, thus enabling an automatic roll change, for instance in a rolling mill, without difficult and time-consuming manual assembly in congested space conditions.

12 Claims, 1 Drawing Sheet

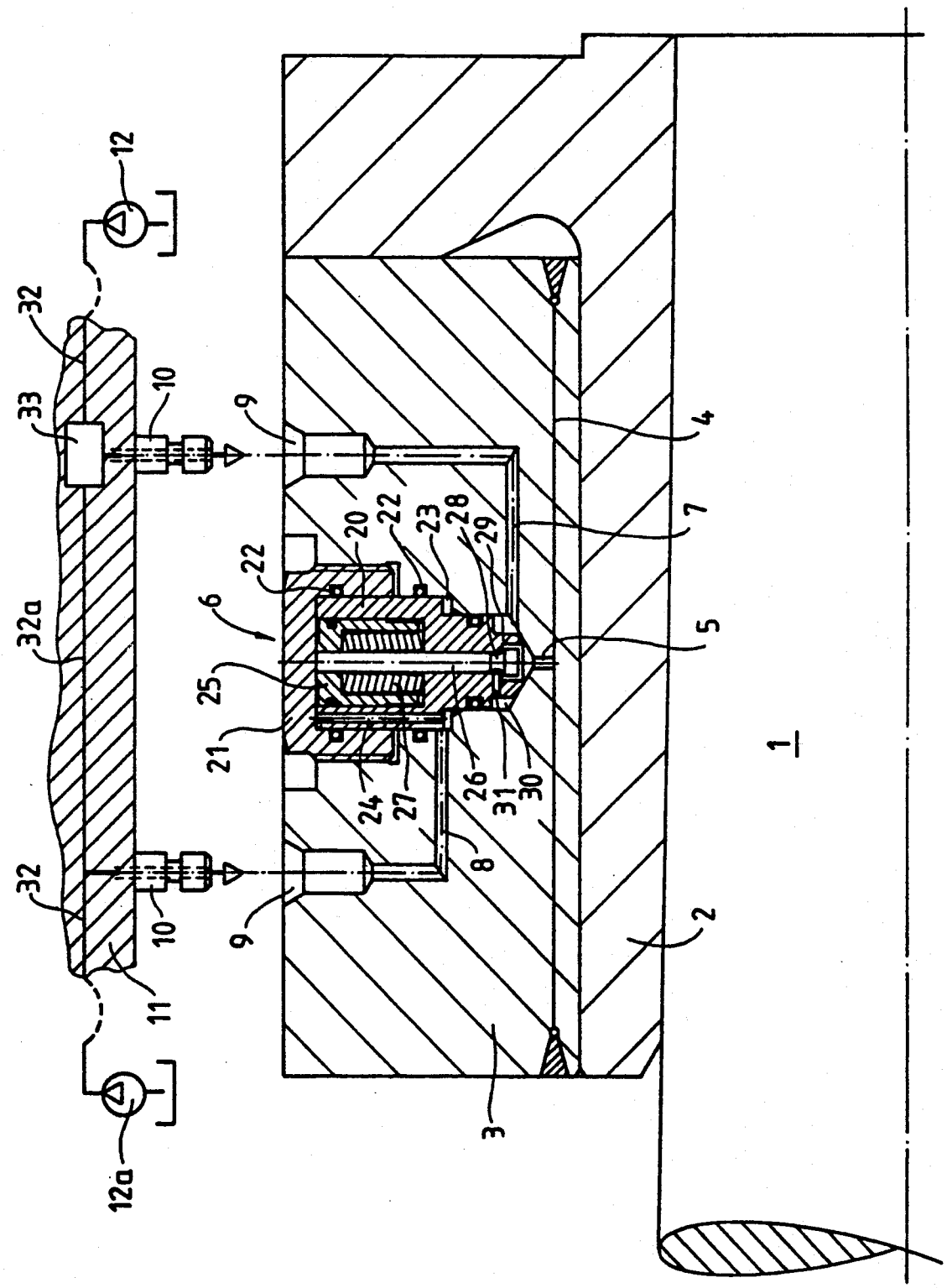

COUPLING WITH A HYDRAULICALLY PRESSURIZED HUB

BACKGROUND OF THE INVENTION

The invention concerns a coupling with a hydraulically pressurized hub for transmitting a torque between a shaft and a hub.

Couplings of this design are used in heavy machinery construction when particularly high torques need to be transmitted. A coupling of this category is known from DE-PS 35 45 651 (U.S. Pat. No. 4,752,275). Often it is necessary, specifically in the case of rolling mill drives, to frequently separate the shaft-hub connection. This involves undesirable down times and assembly work, often impeded by difficult space conditions within the drive train. This is because the pressurized annular chamber within the hub must be relieved so as to enable an axial separation of hub and shaft. This requires first moving the hub in an angular position in which the sealing plug can be reached with a tool. Also the repeated pressurization of the annular chamber by means of appropriate hydraulic devices is often difficult and time consuming, particularly when the coupling is additionally equipped with a safety shear device for overload protection.

The problem underlying the invention is to simplify the assembly and disassembly of the hub, so as to make it usable especially for difficult installation conditions.

SUMMARY OF THE INVENTION

This problem is solved through a coupling with a hub having a cylindrical annular chamber arranged slightly spaced from a shaft. The annular chamber can be filled with a pressurized medium. Serving the pressurization of the annular chamber in the hub, as previously known, is a first hydraulic fluid channel through which the hydraulic fluid is introduced under high pressure.

According to the invention, a hydraulically actuated servo valve is incorporated in this hydraulic fluid channel. The servo valve serves to pass the high pressure prevailing in the first hydraulic fluid channel to the annular chamber, after pressurization of the second hydraulic fluid channel, thereby establishing the torque connection between the hub and the shaft.

Following the buildup of high pressure in the annular chamber, the pressurization of the servo valve can be eliminated causing the valve to close and also the interruption of the hydraulic fluid supply to the first hydraulic fluid channel. In this way there is no longer any manual assembly work required, which increases the availability of the machine concerned. Besides, manual assembly work at points with difficult access is no longer required.

Moreover, this arrangement enables an automatic roll change in rolling mills, since the coupling of hydraulic fluid connections and the sealing of the annular chamber can be accomplished by means of the servo valve through remote actuation.

In one form of the present invention, the servo valve is inserted in the hub from radially outside by means of a fastening bolt or retaining screw and features a valve body which preferably is spring-loaded in an effective "closing" direction and controls the hydraulic fluid supply from the first hydraulic fluid channel to the annular chamber. The servo valve itself is pressurized by the pressure in the second hydraulic fluid channel.

In another form of the invention, the hydraulic fluid supply to the two hydraulic fluid channels may take place via nipples which are jointly fastened on an adapter element and can be connected with the hub by way of connecting bores. Each nipple is connected, by way of the adapter element, with a hydraulic fluid supply.

In another form of the invention, both nipples are connected with the same hydraulic fluid supply, while the adapter element can be caused to act on the hub by means of a remote actuation via the nipples.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

The FIGURE is a sectional view of the coupling of the present invention.

Corresponding reference characters indicate corresponding parts throughout the several views. The exemplification set out herein illustrate a preferred embodiment of the invention, in one form thereof, and such exemplification is not to be construed as limiting the scope of the invention in any manner.

DESCRIPTION OF THE PREFERRED EMBODIMENT

Illustrated is a flanged hub 2 arranged on a shaft 1. Provided on the outer circumference of the hub is a ring-shaped clamping bushing 3 with a cylindrical annular chamber 4 arranged slightly spaced from the hub. This annular chamber can be pressurized with hydraulic fluid admitted via hydraulic fluid channels 5 and 7 and a connecting bore 9. Installed between the hydraulic fluid channels 5 and 7 is a servo valve 6 which is inserted in an appropriate radial bore 23 in the clamping bushing and retained by a fastening screw 21. To this servo valve 6 runs a second hydraulic fluid channel 8, via a second connecting bore 9, on the outer circumference of the clamping bushing. Nipples 10 for each of the two connecting bores 9 serve to supply hydraulic fluid. The nipples 10 are jointly installed on an adapter element 11, with each nipple hooked to a hydraulic fluid supply 12, 12a.

The servo valve 6 features a valve housing 20 which is installed in the clamping bushing 3 by means of the retaining screw 21 establishing a seal through seals 22. Contained with the valve housing 20 is a axially movable valve body consisting of a piston 25 and a valve rod 26. A hydraulic pressure bore 24 extends through the valve housing 20 establishing the connection between the second pressure channel 8, respectively the connecting bore 9 and the end face of the piston 25. The valve rod 26 has on its one end, a valve cone 28 bearing on a valve seat 29 on the valve housing. Contained with the piston 25 is a spring arrangement 27 which firmly forces the rod 26 on the valve seat 29. Between the valve housing 20 and the radially inner part of the bore 23 in the clamping bushing there is an annular groove 30.

A first hydraulic fluid channel 7 and a transverse bore 31 within the valve housing 20 empty into annular groove 30 whereby a connection is established between the first hydraulic fluid channel 7 and the inside of the valve cone 28 on the rod 20. A pressurized connection between the first hydraulic fluid channel 7 and the channel 5 is established only when the valve cone 28 has lifted off the valve seat 29 as the result of hydraulic fluid acting on the end face of the piston 25. Thus, the hydraulic fluid flow through the first hydraulic fluid channel 7 as working medium for the annular chamber 4, controlled by the servo valve 6, is respectively controlled by the pressure buildup in the second hydraulic fluid channel 8. The pressure built up in the annular chamber 4 aids, upon elimination of the control pressure in the second hydraulic fluid channel 8, the force acting on the valve seat 29, in addition to the closing force of the spring arrangement 27.

The nipples 10 for the connecting bores 9 in the clamping bushing 3 can be jointly mounted in an adapter element. The connection to the high-pressure pumps 12, 12a may be fashioned as a hose connection. The adapter element 11 is favorably so arranged within the machine that it can be remotely actuated to approach the clamping bushing 3 establishing the high-pressure connection via the nipples. The assembly and disassembly of shaft 1 and hub 3 can thus be effected by remote control, even within difficult space conditions.

Moreover, it is conceivable to pressurize both hydraulic fluid channels 7 and 8 from one and the same hydraulic fluid supply 12, in which case a suitable valve device 33 in a connecting line 32a must ensure that the servo valve 6 will carry a lower control pressure than the first hydraulic fluid channel 7 to the annular chamber 4. Additionally, provisions must be made for eliminating the control pressure in the second hydraulic fluid channel 8 and closing the servo valve before reducing the pressure in the first hydraulic fluid channel. This assures that the annular chamber will remain pressurized.

Furthermore, of course, it is possible to provide the clamping bushing 3 additionally with a safety device such as described basically in the initially cited DE-PS 35 45 651 (U.S. Pat. No. 4,752,275). The invention concerned here proposes a device for the easy assembly and disassembly of the hub, independent of an annular chamber relief necessitated by an overload.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A coupling for transmitting torque from a hub to a shaft, said hub including a cylindrical annular chamber slightly spaced from the shaft which can be filled with a pressurized medium, said hub further including a first channel connecting said cylindrical chamber to a high pressure supply, and a second hydraulic fluid channel disposed within said hub, said coupling comprising:
a servo valve through which said pressurized medium to said cylindrical annular chamber is routed permitting pressurized closure of said first channel, said servo valve actuable by hydraulic fluid and pressurization via said second hydraulic fluid channel.

2. The coupling according to claim 1, wherein said servo valve is fastened in said hub, from radially outside, by means of a retaining screw.

3. The coupling according to claim 1, wherein said servo valve includes a valve housing and a movable valve body extending through said valve housing, said valve housing communicating through a hydraulic fluid bore with said second hydraulic fluid channel in the hub.

4. The coupling according to claim 3, wherein said valve body is loaded by a spring to close said servo valve.

5. The coupling according to claim 1, further comprising a hydraulic pressure supply connected to the two hydraulic channels via connecting bores in said hub and via nipples which are jointly mounted on an adapter element.

6. The coupling according to claim 5, wherein said nipples are connected each with a hydraulic fluid supply.

7. The coupling according to claim 6, wherein both said connecting nipples communicate with the same hydraulic fluid supply.

8. The coupling according to claim 7, wherein said adapter element, with said connecting nipples, can be moved by remote actuation in said connecting bores in said hub.

9. The coupling according to claim 3, further comprising a hydraulic pressure supply connected to the two hydraulic channels via connecting bores in said hub and via nipples which are jointly mounted on an adapter element.

10. The coupling according to claim 9, wherein said nipples are connected each with a hydraulic fluid supply.

11. The coupling according to claim 10, wherein both said connecting nipples communicate with the same hydraulic fluid supply.

12. The coupling according to claim 11, wherein said adapter element, with said connecting nipples, can be moved by remote actuation in said connecting bores in said hub.

* * * * *